US006705371B2

United States Patent
Ikuno

(10) Patent No.: US 6,705,371 B2
(45) Date of Patent: Mar. 16, 2004

(54) PNEUMATIC RADIAL TIRE

(75) Inventor: Toshifumi Ikuno, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 93 days.

(21) Appl. No.: 09/949,720

(22) Filed: Sep. 12, 2001

(65) Prior Publication Data
US 2002/0053387 A1 May 9, 2002

(30) Foreign Application Priority Data
Sep. 13, 2000 (JP) .................................. 2000-277625

(51) Int. Cl.[7] .......................... B60C 15/00; B60C 15/05
(52) U.S. Cl. ....................... 152/545; 152/539; 152/552; 152/554
(58) Field of Search ................................ 152/539, 540, 152/545, 552, 554

(56) References Cited

U.S. PATENT DOCUMENTS

| 4,890,660 A | * | 1/1990 | Lamock ...................... 152/545 |
| 5,029,627 A | * | 7/1991 | Ochiai ........................ 152/510 |
| 5,379,820 A | | 1/1995 | Cesar et al. |
| 5,743,976 A | * | 4/1998 | Pena ........................... 152/543 |

FOREIGN PATENT DOCUMENTS

| JP | 58-33507 | * | 2/1983 |
| JP | 2-262402 | * | 10/1990 |
| JP | 2-279401 | * | 11/1990 |
| JP | 4-176714 | * | 6/1992 |
| JP | 6-24215 | * | 2/1994 |
| JP | 08-040027 | * | 2/1996 |
| JP | 11-301220 | * | 11/1999 |
| JP | 2000-142021 A | | 5/2000 |

OTHER PUBLICATIONS

Patent Abstracts of Japan, vol. 2000, No. 08 (Oct. 6, 2000) as it relates to JP 2000–142021 A (May 23, 2000).

* cited by examiner

Primary Examiner—Jeff H. Aftergut
Assistant Examiner—Justin Fischer
(74) Attorney, Agent, or Firm—Sughrue Mion, PLLC

(57) ABSTRACT

A pneumatic radial tire includes a bead portion having a plurality of bead cores, and one or plural radial carcass plies wound up from a tire inner side toward an outer side at the respective bead cores. One-half or more of the number of end portion(s) of the radial carcass ply (plies) wound up on the bead cores is/are positioned at each bead core within a range of 35 to 55% of a tire section height as measured from the reference line of the tire section height. In accordance with this structure, rigidity from the bead portion to a side portion of the tire markedly improves. Accordingly, even when the tire is large and a load applied thereto is increased, deformation of the bead portion in the loaded state is suppressed, a strain level of the bead portion is reduced, and excellent durability of the bead portion is ensured.

7 Claims, 2 Drawing Sheets

PNEUMATIC RADIAL TIRE

BACKGROUND OF THE INVENTION

1. Field of the Invention

The present invention relates to a pneumatic radial tire, and in particular, to a pneumatic radial tire which is suitable for airplanes, and to which heavy loads are applied, and which are subjected to high speed traveling.

2. Description of the Related Art

In recent years, airplane manufacturers have promoted the development of extremely large passenger airplanes, and demands with respect to increasing the size and durability of tires therefor have, of necessity, become severe.

In order to ensure good durability which satisfies these demands, it is essential to increase the number of plies of the carcass in the tire structure. However, when the number of plies of the carcass increases, the bead core is located away from the bead base face, and the rim tends to line-contact the tire at the bead base face. As a result, there arises a problem in that drawbacks such as cracking of the bead base face are more likely to occur due to local stress concentration and in that the durability of the bead portion deteriorates.

A pneumatic radial tire having a plurality of bead cores within the bead portion has been proposed as a pneumatic radial tire for large passenger airplanes. An example of such a pneumatic radial tire for airplanes is the pneumatic radial tire disclosed in Japanese Patent Application (JP-A) No. 9-175108.

In the case of this example, there are problems in that the structure becomes complex and costs increase, due to the provision of a crescent-shaped rubber layer. In addition, when the tire is made large and the number of radial carcass plies is increased, as described above, the rim tends to line-contact the tire at the bead base face, and a deterioration in durability of the bead portion is unavoidable.

SUMMARY OF THE INVENTION

In view of the aforementioned facts, an object of the present invention is to provide a pneumatic radial tire in which, even if the tire is large and the load that the tire bears is large, durability of the bead portion can be ensured.

In order to achieve the above-described object, in a first aspect of the present invention, a pneumatic radial tire comprises: a bead portion provided with a plurality of bead cores; and one or plural radial carcass plies which are wound up from a tire inner side toward an outer side at the respective bead cores, wherein one-half or more of the number of end portion(s) of the radial carcass ply (plies) is/are positioned at each bead core within a range of 35 to 55% of a tire section height as measured from the reference line of the tire section height. Here, "the reference line" is defined as a reference line which is parallel to the tire rotation axis, and passes through an intersection of a straight line passing through the bead sheet and an imaginary line extended from the inner wall surface of the rim flange which imaginary line is perpendicular to the tire rotation axis.

In accordance with the pneumatic radial tire of the first aspect, the following effects are achieved.

One-half or more of the number of end portion(s) of the radial carcass ply (plies) wound up on the bead cores is/are disposed at each bead core within a range of 35 to 55% of a tire section height as measured from the reference line of the tire section height. Thus, the rigidity from the bead portion to the side (wall) portion increases, deformation of the bead portion in a loaded state is suppressed, and the strain level of the bead portion can be reduced. In this way, durability of the bead portion is improved.

If one-half or more of the number of end portion(s) of the radial carcass ply (plies) wound up on the bead cores is/are disposed at positions which are less than 35% of the tire section height as measured from the reference line of the tire section height, it is difficult to suppress deformation of the bead portion in a loaded state.

On the other hand, if one-half or more of the number of end portion(s) of the radial carcass ply (plies) wound up on the bead cores is/are disposed at positions which exceed 55% of the tire section height as measured from the reference line of the tire section height, the end portions are positioned at each bead core at the portion of the tire side portion where strain is great, and separation is more likely to occur.

In a second aspect of the present invention, in the pneumatic radial tire of the first aspect, end portions of radial carcass plies, which are among the radial carcass plies wound up from the tire inner side toward the outer side and which are not positioned within the range of 35 to 55% of the tire section height as measured from the reference line of the tire section height, are positioned at an inner side than an outermost end of a rim flange in the radial direction.

In accordance with the pneumatic radial tire of the second aspect, the following effects are achieved.

The end portions of radial carcass plies, which are not positioned within the range of 35 to 55% of the tire section height as measured from the reference line of the tire section height, are positioned at an inner side than an outermost end of a rim flange in the radial direction, i.e., are positioned at a region where strain is relatively little (the strain therein is relatively little because the region is supported by the rim flange). Therefore, separation which is generated from the ply ends can thereby be suppressed.

In a third aspect of the present invention, in the pneumatic radial tire of the first or second aspect, end portions of radial carcass plies which are wound up at a bead core located at an outermost side in the tire axial direction are positioned within the range of 35 to 55% of the tire section height as measured from the reference line of the tire section height.

In accordance with the pneumatic radial tire of the third aspect, the following effects are achieved.

In the bead portion, strain at the time of bearing a load tends to concentrate in the vicinity of the rim flange. Accordingly, by positioning end portions of radial carcass plies, which are wound up at the bead core at the outermost side in the tire axial direction near the rim flange, in a range of 35 to 55% of the tire section height as measured from the reference line of the tire section height, i.e., by setting these end portions of the radical carcass plies at the outer side than the portion at which strain concentrates, in the tire radial direction, separation which is generated from the ply ends can be significantly suppressed.

DESCRIPTION OF THE PREFERRED EMBODIMENTS

Hereinafter, an embodiment of the pneumatic radial tire of the present invention will be described with reference to FIG. 1.

Figure 1:
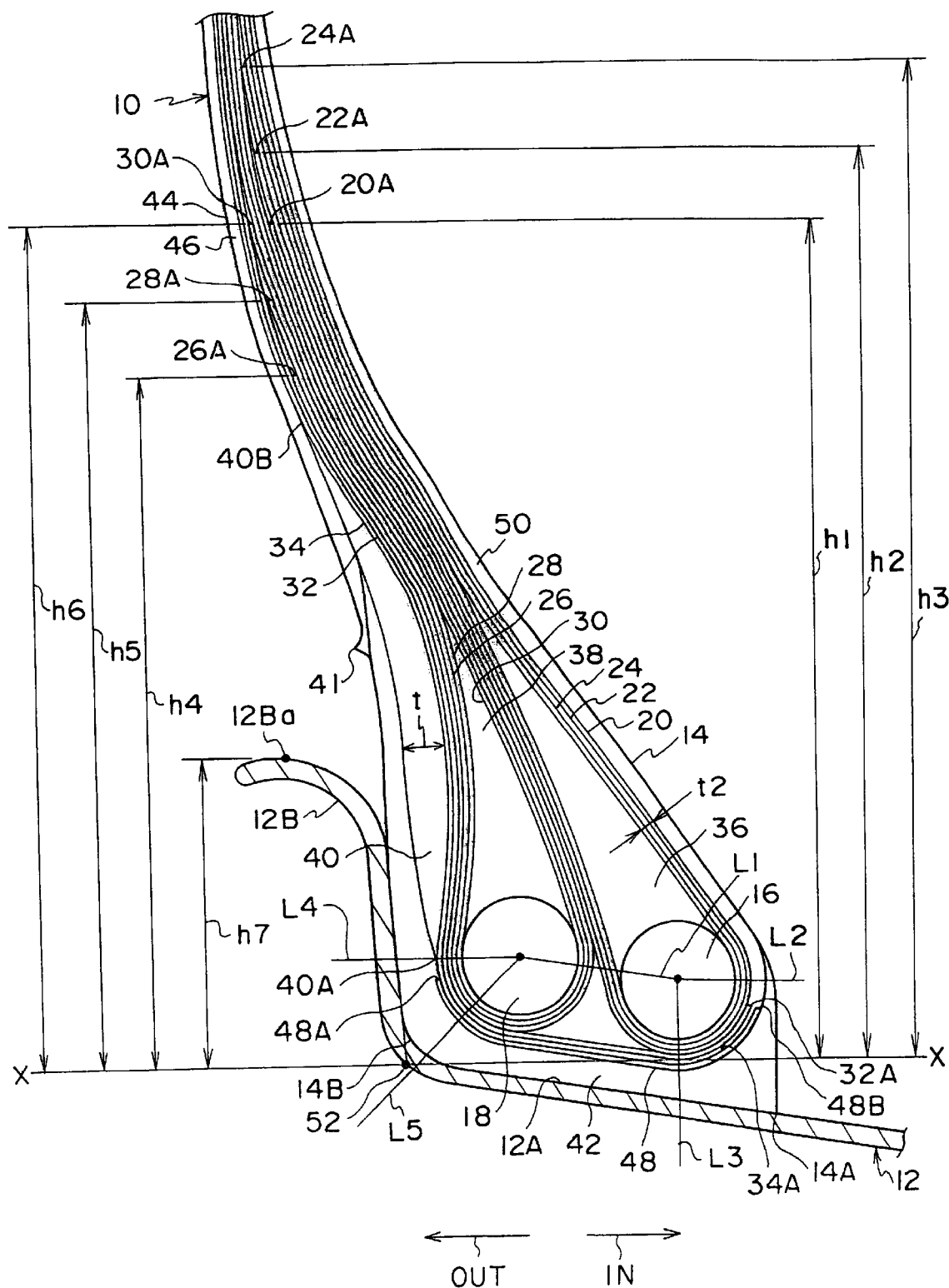
FIG. 1 is a cross-sectional view of a vicinity of a bead portion of a pneumatic radial tire relating to an embodiment of the present invention.

FIG. 1 is a cross-sectional view taken along an axis of rotation of a pneumatic radial tire 10 which is mounted to a rim 12.

The pneumatic radial tire 10 of the present embodiment is used for an airplane. At a bead portion 14, an inner side bead core 16 is provided at an inner side in the tire axial direction (which is the side or direction indicated by the arrow "IN" in FIG. 1), and an outer side bead core 18 is provided at an outer side in the tire axial direction (which is the side or direction indicated by the arrow "OUT" in FIG. 1).

The cross-sectional configuration of each of the inner side bead core 16 and the outer side bead core 18 of the present embodiment is substantially circular.

A straight line L1 connecting the center of the inner side bead core 16 and the center of the outer side bead core 18 is substantially parallel to a bead sheet 12A of the rim 12.

A first turn-up ply 20, a second turn-up ply 22, a third turn-up ply 24, a fourth turn-up ply 26, a fifth turn-up ply 28, a sixth turn-up ply 30, a first down ply 32, and a second down ply 34 are provided as radial carcass plies at the pneumatic radial tire 10 in that order from the tire inner surface, so as to straddle toroidally from one bead portion 14 to the other bead portion 14.

Respective end portions (20A, 22A, 24A) of the first turn-up ply 20, the second turn-up ply 22 and the third turn-up ply 24 are wound up around the inner side bead core 16 from the inner side (of the inner side bead core) toward the outer side (of the inner side bead core) in the tire axial direction.

An inner side filler 36, which has a substantially triangular cross-section and is constituted with a hard rubber, is disposed between the main portions and the wound-up portions of the first turn-up ply 20, the second turn-up ply 22 and the third turn-up ply 24.

Hereinafter, at the radial carcass ply, the portion which extends from one bead core to the corresponding bead core at the opposite side of the equatorial plane is called the main portion, and the portion which is wound up from the bead core toward the outer side in the tire axial direction is called the wound-up portion.

Respective end portions (26A, 28A, 30A) of the fourth turn-up ply 26, the fifth turn-up ply 28 and the sixth turn-up ply 30 are wound up around the outer side bead core 18 from the inner side (of the outer side bead core) toward the outer side (of the outer side bead core) in the tire axial direction.

An outer side filler 38, which has a substantially triangular cross-section and is constituted with a hard rubber, is disposed between the main portions and the wound-up portions of the fourth turn-up ply 26, the fifth turn-up ply 28 and the sixth turn-up ply 30.

The tensile stress at 100% elongation of the rubber constituting the outer side filler 38 is preferably set in a range of 50 to 150 kg/cm$^2$.

Respective end portions (32A, 34A) of the first down ply 32 and the second down ply 34, which are disposed at the outermost side of the plies in the tire axial direction, are wound around the outer side bead core 18 from the outer side toward the inner side in the tire axial direction. The end portion 32A of the first down ply 32 and the end portion 34A of the second down ply 34 are disposed in a vicinity of a bead toe 14A of the bead portion 14.

The vicinity of the bead toe 14A means the portion which is at the inner side of a straight line L2 in the tire radial direction which line passes through the center of the inner side bead core 16 and is parallel to the tire rotation axis, and is at the inner side of a straight line L3 in the tire axial direction which line passes through the center of the inner side bead core 16 and is parallel to the tire radial direction.

In a vicinity of an end portion 12Ba of a rim flange 12B at the outer side in the tire radial direction, a portion at which the first down ply 32, the second down ply 34, the wound-up portions of the fourth turn-up ply 26, the fifth turn-up ply 28, and the sixth turn-up ply 30 are layered, is concave in a large arc shape toward the inner side in the tire axial direction.

At the bead portion 14, a stiffener 40, which is constituted with rubber, is disposed in the above-described concave portion at the outer side of the outermost second down ply 34 in the tire widthwise direction.

The tensile stress at 100% elongation of the rubber constituting the stiffener 40 is preferably set within a range of 20 to 50 kg/cm$^2$.

The position of an end 40A of the stiffener 40 at the inner side in the radial direction is preferably disposed within a region sandwiched between a straight line L4, which passes through the center of the outer side bead core 18 and is parallel to the tire axial direction, and a straight line L5, which passes through that same center and is inclined at 45° with respect to the tire axial direction. In the present embodiment, the end 40A of the stiffener 40 at the inner side in the radial direction is positioned at the outer side of the center of the outer side bead core 18 in the tire axial direction (on straight line L4 in the shown example).

On the other hand, the position of an end 40B of the stiffener 40 in the radial direction is preferably within a range of 30 to 40% of a tire section height H as measured from the reference line of the section height H. In the present embodiment, the end 40B of the stiffener 40 at the outer side in the radial direction is disposed at a position which is 35% of the tire section height H (to be described in detail later) as measured along the tire radial direction from a reference line X—X (to be described in detail later at page 11).

An annular rim line 41 is formed at the outer surface of the bead portion 14.

The rim line 41 is provided at a position in the height direction which is 1.5 times a dimension h7 of the rim flange 12B in the height direction measured along the tire radial direction from the reference line X—X.

At the portion, at the inner side of the rim line 41 in the tire axial direction, which is a range in which thrusting up from the rim flange 12B is intense), a gauge t of the stiffener 40 is preferably set within a range of 2 to 5 times the total gauge of the three turn-up plies wound up around the inner side bead core 16, which are the first turn-up ply 20, the second turn-up ply 22, and the third turn-up ply 24.

In the present embodiment, a maximum gauge t1 of the stiffener 40 is set to 3 times a total gauge t2 of the three turn-up plies which are the first turn-up ply 20, the second turn-up ply 22, and the third turn-up ply 24.

Note that the gauge of the stiffener 40 gradually decreases from the maximum value thereof, as the stiffener 40 extends toward the inner side and outer side in the tire radial direction.

At the outer surface of the bead portion 14, a rubber chafer 42 is provided from the bead toe 14A to the vicinity of a position which is slightly beyond, toward the outer side in the tire radial direction, the end 12Ba of the rim flange 12B at the outer side in the tire radial direction.

A side rubber 46 is provided at the outer surface of a side portion 44 so as to cover a portion of the second down ply 34 and a portion of the stiffener 40.

Further, a fiber cord chafer 48, which includes a plurality of organic fiber cords, is provided along the outer surface of the second down ply 34, at the inner side of the inner side bead core 16 and the outer side bead core 18 in the tire radial direction.

An end 48A at the outer side of the fiber cord chafer 48 in the tire axial direction is positioned further toward a bead heel 14B side than the center of the outer side bead core 18. An end 48B at the inner side of the fiber cord chafer 48 in the tire axial direction is positioned further toward the bead toe 14A side than the center of the inner side bead core 16.

Note that an inner liner 50 is disposed at the inner side of the first turn-up ply 20.

One-half or more of the number of end portion(s) of the turn-up ply (plies) must be positioned at each bead core within a range of 35 to 55% of the tire section height H as measured from the reference line X—X of the tire section height H.

As is known, the tire section height H is the dimension from the reference line X—X to an outermost position of the tread surface in the tire radial direction, which is measured along the tire radial direction. The reference line X—X is parallel to the tire rotation axis, and passes through an intersection 52 of a straight line passing through the bead sheet 12A and an imaginary line extended from the inner wall surface of the rim flange 12B which line is perpendicular to the tire rotation axis.

In the present embodiment, as measured along the tire radial direction from the reference line X—X, a dimension h1 in the height direction to the end portion 20A of the first turn-up ply 20 is 46% of the tire section height H (0.46H), a dimension h2 in the height direction to the end portion 22A of the second turn-up ply 22 is 50% of the tire section height H (0.50H), a dimension h3 in the height direction to the end portion 24A of the third turn-up ply 24 is 54% of the tire section height H (0.54H), a dimension h4 in the height direction to the end portion 26A of the fourth turn-up ply 26 is 38% of the tire section height H (0.38H), a dimension h5 in the height direction to the end portion 28A of the fifth turn-up ply 28 is 42% of the tire section height H (0.42H), and a dimension h6 in the height direction to the end portion 30A of the sixth turn-up ply 30 is 46% of the tire section height H (0.46H).

In the present embodiment, the dimension h7 in the height direction of the rim flange 12B as measured along the tire radial direction from the reference line X—X is 14% of the tire section height H (0.14H).

Note that, in the pneumatic radial tire 10 of the present embodiment, structures other than the bead portion 14 are the same as those of a general pneumatic radial tire for airplanes, and thus, description of the other tire structures is omitted.

(Operation)

Next, operation of the pneumatic radial tire 10 of the present embodiment will be described.

One-half or more of the number of end portion(s) of the radial carcass ply (plies) among the first turn-up ply 20, the second turn-up ply 22, the third turn-up ply 24, the fourth turn-up ply 26, the fifth turn-up ply 28, and the sixth turn-up ply 30, which are wound up on the inner side bead core 16 and the outer side bead core 18, are disposed at each bead core within a range of 35 to 55% of the tire section height H as measured from the reference line X—X of the tire section height H. Thus, the rigidity from the bead portion 14 to the side portion 44 is enhanced. As a result, deformation of the bead portion 14 when a load is applied thereto is suppressed, the strain level of the bead portion 14 is reduced, and the durability of the bead portion 14 is improved.

If one-half or more of the number of end portion(s) of the radial carcass ply (plies) among the first turn-up ply 20, the second turn-up ply 22, the third turn-up ply 24, the fourth turn-up ply 26, the fifth turn-up ply 28, and the sixth turn-up ply 30, which are wound up on the inner side bead core 16 and the outer side bead core 18, are disposed at positions which are less than 35% of the tire section height H as measured from the reference line X—X, deformation of the bead portion 14 when a load is applied thereto cannot be suppressed so significantly as compared with conventional products.

On the other hand, if one-half or more of the number of end portion(s) of the radial carcass ply (plies) among the first turn-up ply 20, the second turn-up ply 22, the third turn-up ply 24, the fourth turn-up ply 26, the fifth turn-up ply 28, and the sixth turn-up ply 30, which are wound up on the inner side bead core 16 and the outer side bead core 18, are disposed at positions which exceed 55% of the tire section height H, the end portions approach portions where strain of the tire side portion 44 is great, and separation is more likely to occur from the end portions.

Further, the end portion 24A of the third turn-up ply 24 and the end portion 30A of the sixth turn-up ply 30, which are disposed in a vicinity of the end portion 12Ba of the rim flange 12B (the end portion 12Ba is the outer side end of the rim flange 12B in the tire radial direction), are disposed at the inner side of the end portion 12Ba in the tire radial direction (i.e., are disposed at a region which strain is little). Thus, occurrence of separation from the ply ends (the end portion 24A and the end portion 30A) can be suppressed.

At the time of bearing a load, strain tends to concentrate in a vicinity of the rim flange 12B among the portions of the bead portion 14. However, the end portion 30A of the sixth turn-up ply 30, which is wound up on the outer side bead core 18 at the outermost side in the tire axial direction near the rim flange 12B, is positioned in a range of 35 to 55% of the tire section height H as measured from the reference line X—X of the tire section height H, and is further toward the outer side in the tire radial direction than the portion where strain concentrates. Thus, the occurrence of separation from the ply end (end portion 30A) can be suppressed.

Further, because the physical properties of the stiffener 40 are limited to those described above, the rigidity balance of the bead portion 14 is optimal, and strain can be kept to a minimum.

The end 40A of the stiffener 40 at the inner side in the radial direction is disposed at the outer side of the center of the outer side bead core 18 in the axial direction (and specifically, is disposed on the straight line L4). Thus, all of the regions (the vicinity of the rim flange 12B) where strain concentrates at the time of bearing a load are covered, and the optimal rigidity balance can be maintained.

If the end 40A of the stiffener 40 at the inner side in the radial direction is positioned at the outer side of the straight line L4 in the tire radial direction, all of the regions (the vicinity of the rim flange 12B) at which strain concentrates at the time of bearing a load cannot be covered, and the optimal rigidity balance cannot be maintained.

Further, if the end 40A of the stiffener 40 at the inner side in the radial direction is positioned at the inner side of the straight line L5 in the tire radial direction, the stiffener 40, which is softer than the rubber chafer 42, is positioned at the bead base face. Thus, the rigidity needed at the base surface cannot be ensured.

Further, at the portion at the inner side of the rim line 41 in the tire axial direction, the gauge t1 of the stiffener 40 is set to be 3 times the total gauge t2 of the three turn-up plies wound up around the inner side bead core 16, which are the first turn-up ply 20, the second turn-up ply 22, and the third turn-up ply 24. Thus, the rigidity balance of the bead portion 14 is optimal, and the strain can be kept to a minimum.

If the gauge t1 of the stiffener 40 is less than 3 times the total gauge t2, the rigidity balance of the bead portion 14 deteriorates, and strain cannot be kept to a minimum.

On the other hand, if the gauge t1 of the stiffener 40 exceeds five times the total gauge t2, the rigidity balance of the bead portion 14 deteriorates, and strain cannot be kept to a minimum.

Note that, although the pneumatic radial tire 10 of the above-described present embodiment is provided with two bead cores within the bead portion 14, the number of bead cores may be 3 or more. Further, the number of radial carcass plies is not limited to the number in the above-described embodiment, In any case, it suffices as long as the positions of the end portions of the radial carcass plies are located within the above-described range.

Figure 2:
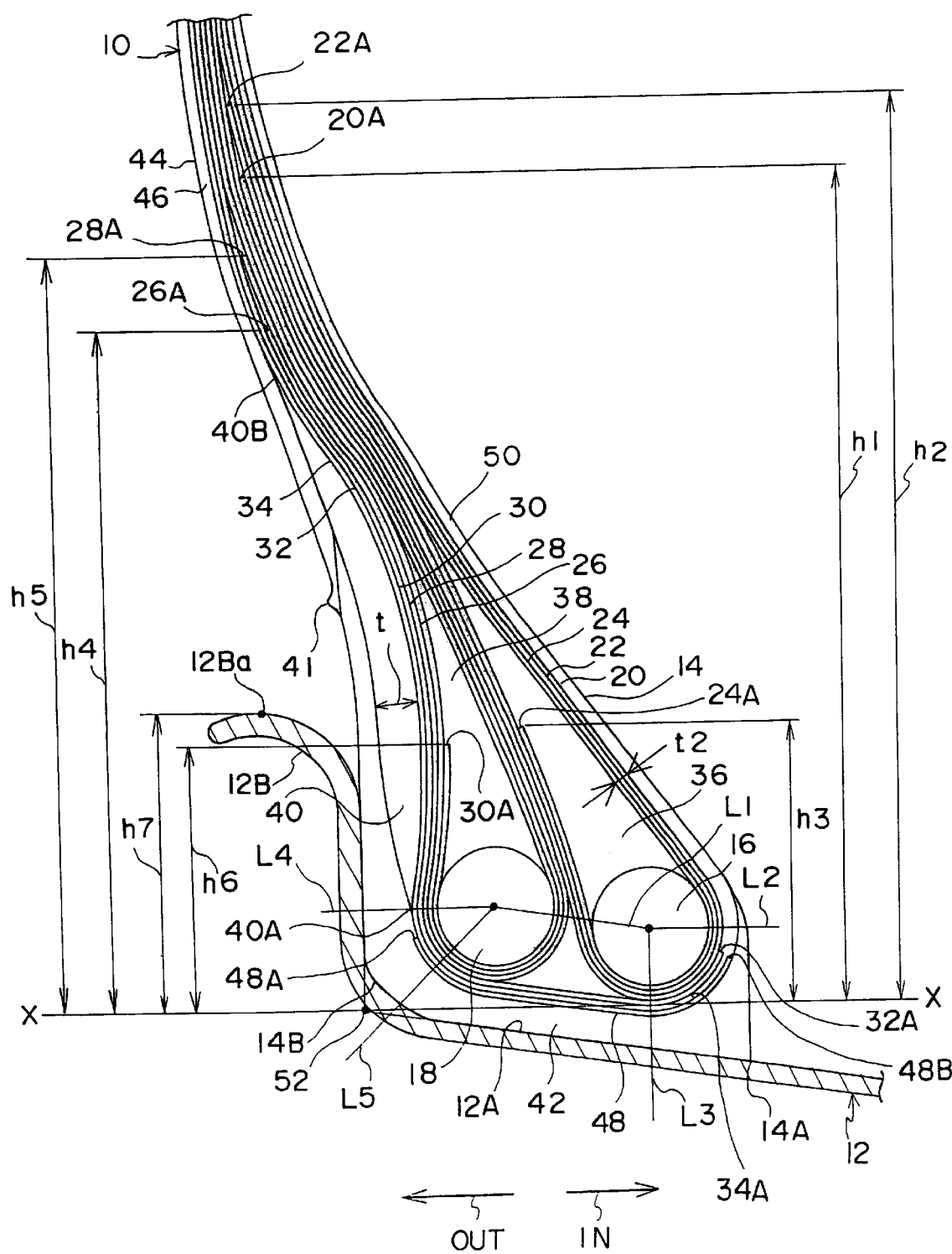
FIG. 2 is a cross-sectional view of a vicinity of a bead portion of a pneumatic radial tire relating to another embodiment of the present invention.

Further, in a second embodiment of the present invention, as shown in FIG. 2, the end portion 24A of the third turn-up ply 24 and the end portion 30A of the sixth turn-up ply 30, which are disposed in a vicinity of the end portion 12Ba of the rim flange 12B, are disposed at the inner side of the end portion 12Ba of the rim flange 12B in the tire radial direction (i.e., are disposed at a region where strain is relatively little). According to the present embodiment, occurrence of separation from the ply ends (the end portion 24A and the end portion 30A) can be suppressed as in the aforementioned first embodiment.

EXAMPLES

In order to confirm the effects of the present invention, four Example tires to which the present invention was applied, and two Comparative Example tires were test manufactured, and a drum test in accordance with TSO-C62d was carried out thereon.

The tire size of each tire was 1400×530R23 36PR.

The basic structural members of each tire were the same as those of the above-described embodiment, but the positions of the end portions of the turn-up plies differed as shown in following Table 1.

TABLE 1

| Bead core | Dimension in the height direction of turn-up ply end portion | Examples | | | | Com. Examples | |
|---|---|---|---|---|---|---|---|
| | | 1 | 2 | 3 | 4 | 1 | 2 |
| inner side | h1 | 0.46H | 0.46H | 0.46H | 0.46H | 0.38H | 0.30H |
| | h2 | 0.50H | 0.50H | 0.50H | 0.50H | 0.45H | 0.34H |
| | h3 | 0.54H | 0.15H | 0.13H | 0.13H | 0.52H | 0.52H |
| outer side | h4 | 0.38H | 0.38H | 0.13H | 0.38H | 0.35H | 0.46H |
| | h5 | 0.42H | 0.42H | 0.42H | 0.42H | 0.30H | 0.34H |
| | h6 | 0.46H | 0.46H | 0.46H | 0.46H | 0.16H | 0.30H |
| TSO-C62d drum test results | | Completed entire distance | completed entire distance | completed entire distance | Completed entire distance | did not complete entire distance | did not complete entire distance |

The results of the tests show that the tires of Examples 1 through 4, to which the present invention was applied, all cleared the required standards of TSO-C62d, but Comparative Example tires 1, 2 could not.

Because the pneumatic radial tire of the present invention is structured as described above, excellent effects are achieved in that, even if the tire is large and the load which is borne by the tire is large, excellent durability can be ensured.

What is claimed is:

1. A pneumatic radial tire comprising:

a bead portion provided with a plurality of bead cores; and radial carcass plies which are wound up from a tire inner side toward an outer side at the respective bead cores, wherein one-half or more of the number of end portions of the radial carcass plies are positioned at each bead core within a range of 35 to 55% of a tire section height as measured from the reference line of the tire section height, and wherein end portions of radial carcass plies, which are among the radial carcass plies wound up from the tire inner side toward the outer side at the respective bead cores and which are not positioned within the range of 35 to 55% of the tire section height as measured from the reference line of the tire section height, are positioned at an inner side of an outermost end of a rim flange in the tire radial direction.

2. A pneumatic radial tire according to claim 1, wherein end portions of radial carcass plies which are wound up at a bead core at the outermost side in a tire axial direction are positioned within the range of 35 to 55% of the tire section height as measured from the reference line of the tire section height.

3. A pneumatic radial tire according to claim 1, further comprising at least one down ply disposed so as to be wound around the plurality of bead cores from an outermost surface of the radial carcass plies toward a bead base in a tire axial direction, and a stiffener disposed at an outer side of the down ply in a tire axial direction, the down ply being located at the outermost side in the tire axial direction.

4. A pneumatic radial tire according to claim 3, wherein a tensile stress at 100% elongation of a rubber constituting the stiffener is set in a range of 20 to 50 kg/cm$^2$.

5. A pneumatic radial tire according to claim 3, wherein a position of an end of the stiffener at the inner side in the tire radial direction is disposed within a region sandwiched between a straight line, which passes through a center of the outermost bead core in the tire axial direction and which is parallel to the tire axial direction, and a straight line, which passes through said center and is inclined at 45° with respect to the tire axial direction.

6. A pneumatic radial tire according to claim 5, wherein the position of the end of the stiffener at the inner side in the tire radial direction is positioned on a straight line which passes through the center of the outermost bead core in the tire axial direction and which is parallel to the tire axial direction.

7. A pneumatic radial tire according to claim 3, wherein a position of an end of the stiffener at an outer side in the tire radial direction is positioned within a range of 30 to 40% of the tire section height as measured from the reference line of the tire section height.

* * * * *